(12) United States Patent
Bilgory et al.

(10) Patent No.: US 9,218,273 B2
(45) Date of Patent: Dec. 22, 2015

(54) AUTOMATIC GENERATION OF A RESOURCE RECONFIGURING TEST

(71) Applicant: International Business Machines Corporation, Armonk, NY (US)

(72) Inventors: Erez Lev Meir. Bilgory, Haifa (IL); Alex Goryachev, Haifa (IL); Ronny Morad, Kiriat Ata (IL); Tali Rabetti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/897,456

(22) Filed: May 20, 2013

(65) Prior Publication Data

US 2014/0344785 A1 Nov. 20, 2014

(51) Int. Cl.
G06F 9/44 (2006.01)
G06F 9/46 (2006.01)
G06F 11/36 (2006.01)

(52) U.S. Cl.
CPC .................................. *G06F 11/3684* (2013.01)

(58) Field of Classification Search
None
See application file for complete search history.

(56) References Cited

U.S. PATENT DOCUMENTS

| | | | | |
|---|---|---|---|---|
| 5,659,554 | A * | 8/1997 | Okayasu | 714/738 |
| 6,243,862 | B1 * | 6/2001 | Lebow | 717/131 |
| 7,089,534 | B2 * | 8/2006 | Hartman et al. | 717/125 |
| 7,752,006 | B2 * | 7/2010 | Copty et al. | 702/123 |
| 8,082,541 | B2 | 12/2011 | Pramanick et al. | |
| 8,117,499 | B2 * | 2/2012 | Copty et al. | 714/37 |
| 8,397,217 | B2 * | 3/2013 | Goryachev et al. | 717/124 |
| 8,868,976 | B2 * | 10/2014 | Ben-Yehuda et al. | 714/32 |
| 8,984,490 | B1 * | 3/2015 | Dahan | 717/127 |
| 2003/0028856 | A1 * | 2/2003 | Apuzzo et al. | 717/124 |
| 2003/0037314 | A1 * | 2/2003 | Apuzzo et al. | 717/125 |
| 2008/0319729 | A1 * | 12/2008 | Copty et al. | 703/17 |
| 2010/0318850 | A1 * | 12/2010 | Copty et al. | 714/33 |
| 2011/0209004 | A1 * | 8/2011 | Goryachev et al. | 714/33 |
| 2012/0117424 | A1 * | 5/2012 | Ben-Yehuda et al. | 714/26 |
| 2012/0311539 | A1 * | 12/2012 | Bullard et al. | 717/127 |
| 2012/0311541 | A1 * | 12/2012 | Bullard et al. | 717/127 |
| 2013/0159974 | A1 * | 6/2013 | Norton et al. | 717/124 |
| 2014/0344785 | A1 * | 11/2014 | Bilgory et al. | 717/124 |

OTHER PUBLICATIONS

Emek et al., X-GEn: A Random Test-Case Generator for Systems and SOCs, published by IEEE, 2002, pp. 1-6.*
Goryachev et al., Hybrid System-level Test Generation Approach for Heterogeneous System, DAC user track 2010, pp. 1-4.*
Test Sequence GEneration: Methodology and Rules, Version 1.0.0, published by Alcatel, 2004, pp. 1-34.*
Fu et al., "A Shared-Variable-Based Synchronization Approach to Efficient Cache Coherence Simulation for Multi-Core Systems", Design, Automation & Test in Europe Conference & Exhibition, pp. 1-6, Mar. 2011.
Yu et al., "A Critical-Section-Level Timing Synchronization Approach for Deterministic Multi-Core Instruction-Set Simulations", Design, Automation & Test in Europe Conference & Exhibition, pp. 643-648, 2013.

* cited by examiner

*Primary Examiner* — Tuan Q. Dam
*Assistant Examiner* — Zheng Wei

(57) ABSTRACT

A test generator generating a test for a system having a plurality of executing entities that are capable of concurrent execution, the test comprises transactions that comprise one or more access transactions that are configured to access a shared resource and one or more reconfiguration transactions configured that are configured to reconfigure the shared resource, wherein said generating comprises: determining a partial order between pairs of transactions that are both associated with the shared resource and that at least one of which is a reconfiguration transaction; and generating the test so as to enforce the partial order during execution of the test by the system.

18 Claims, 4 Drawing Sheets

AUTOMATIC GENERATION OF A RESOURCE RECONFIGURING TEST

TECHNICAL FIELD

The present disclosure relates verification in general, and to verification of hardware system, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During a verification phase, developers, QA staff members, verification engineers, and the like test System Under Test (SUT) to verify that a newly developed SUT operates properly. In some cases, test cases (also referred to simply as "tests") may be devised to provide stimuli to the SUT, and enable testing whether its operation is correct (e.g., as expected).

Verification of hardware systems may include running simulations of the SUT using a simulator or similar platform that is configured to mimic the functionality of the SUT and may be used before the fabrication of the SUT itself. Verification may also be performed in a post-silicon stage.

Test-generation may be used to generate stimuli to be provided the SUT (or simulation thereof), also referred to as a test. The test may include transactions that may be executed in parallel by different components of the SUT and which may be configured to exercise different parts of the SUT.

Tests may be generated by system level test generators. In some exemplary embodiments, a generator may generate a test as an initial step that is followed by a stimulated execution of the test. The test may include stimuli for agents of the system. Optionally, the generator may also create an initial configuration for the components and resources in the system. In some cases, the test generator gets input from a user that directs the generator to wanted scenarios.

The generated tests may have to be valid. Tests may have to be valid not only with respect to the system architectural definition, but also with respect to the input of the user that is using the generator, i.e. in some cases the test should exercise the system in the way that the user specified.

BRIEF SUMMARY

One exemplary embodiment of the disclosed subject matter is a computer-implemented method performed by a computerized device, comprising: generating, by a test generator, a test for a system having a plurality of executing entities that are capable of concurrent execution, the test comprises transactions to be performed by the plurality of executing entities, the transactions comprise: one or more access transactions configured, when executed by an executing entity, to use a shared resource during the execution of the test, and one or more reconfiguration transactions configured, when executed by an executing entity, to modify a configuration of the shared resource during the execution of the test; wherein the test is configured to cause at least two executing entities to perform access or reconfiguration transactions; wherein said generating comprises: determining a partial order between pairs of transactions that are both associated with the shared resource and that at least one of which is a reconfiguration transaction; and generating the test so as to enforce the partial order during execution of the test by the system.

Another exemplary embodiment of the disclosed subject matter is an apparatus having a processor, the processor being adapted to perform the steps of: generating a test for a system having a plurality of executing entities that are capable of concurrent execution, the test comprises transactions to be performed by the plurality of executing entities, the transactions comprise: one or more access transactions configured, when executed by an executing entity, to use a shared resource during the execution of the test, and one or more reconfiguration transactions configured, when executed by an executing entity, to modify a configuration of the shared resource during the execution of the test; wherein the test is configured to cause at least two executing entities to perform access or reconfiguration transactions; wherein said generating comprises: determining a partial order between pairs of transactions that are both associated with the shared resource and that at least one of which is a reconfiguration transaction; and generating the test so as to enforce the partial order during execution of the test by the system.

Yet another exemplary embodiment of the disclosed subject matter is a computer program product comprising a non-transitory computer readable medium retaining program instructions, which instructions when read by a processor, cause the processor to perform a method comprising: generating a test for a system having a plurality of executing entities that are capable of concurrent execution, the test comprises transactions to be performed by the plurality of executing entities, the transactions comprise: one or more access transactions configured, when executed by an executing entity, to use a shared resource during the execution of the test, and one or more reconfiguration transactions configured, when executed by an executing entity, to modify a configuration of the shared resource during the execution of the test; wherein the test is configured to cause at least two executing entities to perform access or reconfiguration transactions; wherein said generating comprises: determining a partial order between pairs of transactions that are both associated with the shared resource and that at least one of which is a reconfiguration transaction; and generating the test so as to enforce the partial order during execution of the test by the system.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
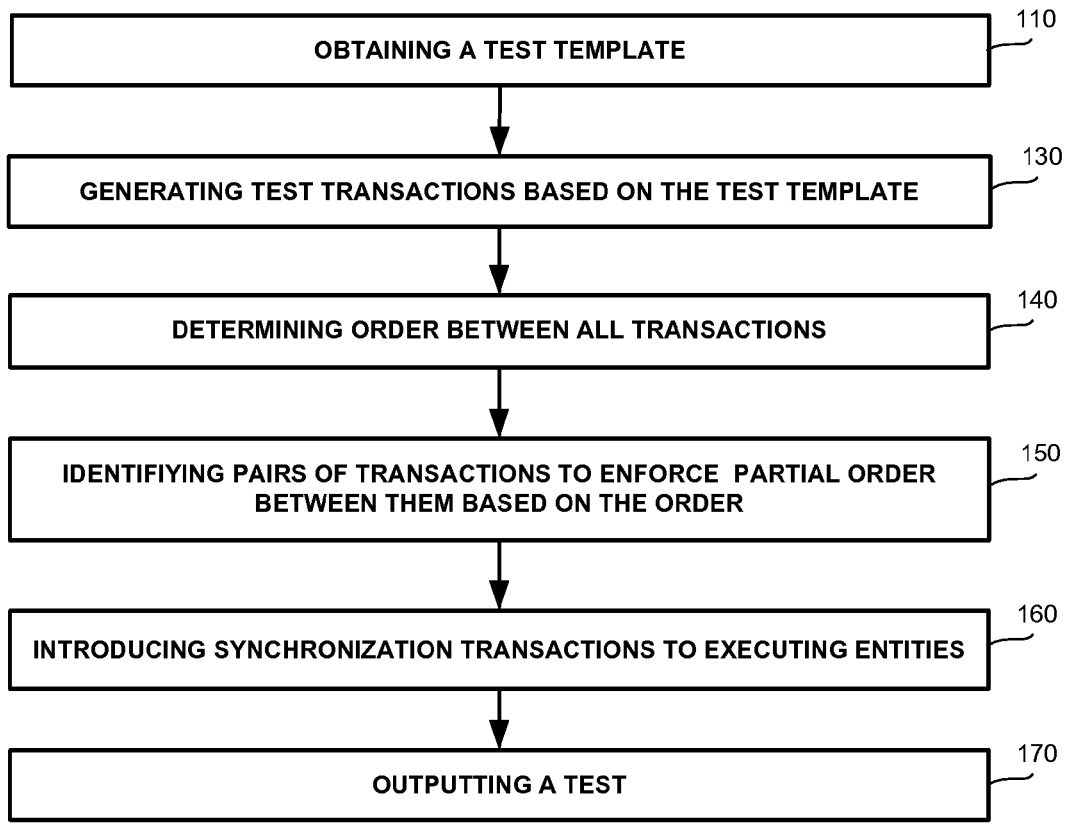
FIG. 1 shows a flowchart diagram of a method, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to enforce execution order of transactions in a generated test which is executed by a hardware system in parallel.

A hardware system, also referred to as a SUT or DUT, may be a processor, a circuit, a design, a device implemented at least in hardware or the like. The hardware system may be responsive to stimuli and may be configured to execute transactions based on the stimuli.

The hardware system may comprise a plurality of executing entities, also referred to as agents or system agents. The executing entities may execute transactions in parallel to each other. An executing entity may be, for example, a processor, a core, a hardware entity, or the like. A transaction may be, for example, a processor instruction, a system-level transaction, or the like.

The disclosed subject matter may enforce a specific order on the execution of the transaction. In some exemplary embodiments, the enforced order may be partial order associated with only a portion of the transactions thereby enabling usage of the ability of the system to execute transactions in parallel.

Another technical problem dealt with by the disclosed subject matter is to generate a reconfiguration test that includes a reconfiguration scenario of a shared resource. The reconfiguration scenario may include executing transactions by different executing entities and modifying a configuration of a shared resource. The configuration of the shared resource may affect functionality of executed transactions. An order of execution of the transactions in reconfiguration test may be of importance.

In some exemplary embodiments, the hardware system may comprise a plurality of shared resources that are accessible to a plurality of executing entities. A shared resource may have configurable state. An executing entity may be able to reconfigure a resource, such as using a reconfiguration transaction.

In some exemplary embodiments, the operation of the SUT may depend on its configurable internal state. Meaning that the functionality of an executing entity performing a transaction may depend on the state of a shared resource.

For example, a translation table can be viewed as a shared resource. Each entry in the translation table translates an address from a CPU address ("virtual address") to the address in the memory device ("physical address"). The translation is based on the values in the table, and can be changed by writing to the table. When a CPU initiates a store to memory transaction the translation table may be used for the execution of the transaction. The same memory access transaction initiated by the CPU can have different outcomes depending on the configuration of the translation table. As can be appreciated the same transaction may or may not be a reconfiguration transaction based on its parameters (e.g., reconfiguration transaction if the store transaction targets the translation table and non-reconfiguration transaction if the store transaction targets other memory locations). In some exemplary embodiments, a transaction may change the configuration of a resource. For the example above, the CPU can write a different value to the translation entry. Subsequent uses of the resource will behave according to the new configuration.

As another example, a message passing hardware component that is operable to provide for a communication channel between hardware threads may be a shared resource. The internal state of the message passing hardware component may be used to indicate to which hardware thread messages are passed. The target hardware thread may be modified by a transaction reconfiguring the internal state of the component. Other reconfigurable shared resources may be available.

In some exemplary embodiments, reconfiguration tests may be used during verification, since some bugs may be uncovered when reconfiguration occurs during the test. In some cases, a hardware reconfiguration scenario includes transactions that use the shared resource before and after a reconfiguration transaction.

As the test may include transactions that are executed by different executing entities and as the executing entities may execute concurrently or in parallel, in some cases, the order of execution between the transactions may be unpredictable and may be observed as non-deterministic. In addition, when a simulator is used, such as an HDL simulator, the simulator's performance may differ than that of the target SUT once produced.

One technical solution is to determine a partial order between transactions and enforcing said partial order using synchronization transactions. The partial order may be determined between transactions that are associated with the same shared resource, such as access transactions making use of the shared resource and reconfiguration transactions modifying the internal state of the shared resource.

Synchronization transactions may be used to prevent an executing entity from initiating a transaction until another transaction, which is ordered before the transaction, was executed and its execution has concluded. For example, a "wait" synchronization transaction may enforce an executing entity to delay the execution of a transaction until a signal is received from a "signal" synchronization transaction, executed only after a different transaction execution is finished. Such operations allow enforcing an order of execution between a first transaction and a second transaction. In some exemplary embodiments, the signal operation may be executed immediately after the first transaction is completed (e.g., a next transaction after executing the first transaction) and the wait transaction may be executed immediately before execution of the second transaction. Such an embodiment enforces that the first transaction be executed before the second transaction, while avoid to enforce full order or order between transactions associated with different executing entities.

In some exemplary embodiments, the enforced order may be a partial order and not a full order of all transactions. The partial order may be determined only with respect to pairs of transactions that use or modify a same shared resource. In some exemplary embodiments, execution by the same executing entity also enforces an order and hence the partial order may be enforced only with respect to transactions that are associated with the same shared resource and are executed by different executing entities.

In some exemplary embodiments of the disclosed subject matter, an order between the pair of transactions may be enforced only when at least one of the transactions reconfigures the shared resource. In some exemplary embodiments, the order between access transactions may not affect the functionality of the test and therefore the test may avoid enforcing order therebetween.

One technical effect of utilizing the disclosed subject matter is enabling offline generating of system level test cases, using automatic test generators, wherein a test may reconfigure and use system resources, with more than one executing entity, without requiring the user to explicitly describe the scenario and the needed ordering.

As the ordering may be determined automatically and without user intervention, the disclosed subject matter may be utilized to generate a reconfiguration test based on a test template that does not require a reconfiguration scenario. Reconfiguration tests may be generated automatically based on heuristic decisions by the generator.

Another technical effect of utilizing the disclosed subject matter is reducing the slowing effect of enforcing a complete execution order. Additionally or alternatively, the disclosed subject matter may provide for enforcement of order only between transactions that the order of execution between them has the potential to affect the functionality of the test (e.g., in the absence of a bug in the SUT). As such, the disclosed subject matter is intrusive but only in a minimal manner.

Yet another technical effect is to provide for minimal number of synchronization transactions in the test which results in avoiding unneeded limitations on the order of execution.

In some exemplary embodiments, the generated test may provide for many potential alternative orders of execution. In some exemplary embodiments, the test may allow for many ordering of unrelated transactions in different simulations. As such, the test may be considered of higher quality than a test which enforces a specific single ordering.

Furthermore, minimizing number of synchronization transactions reduces simulation time. Simulation time may be a limited resource that should be allocated between different verification tasks.

Yet another technical effect is providing an automatic solution that takes the responsibility off the verification engineer and eliminates bugs and human-errors. The verification engineer can focus on the desired scenario and not on the synchronization transactions needed for correct, predicable simulation of the scenario.

It will be understood that the disclosed subject matter may be utilized in a system having a plurality of shared resources. In such a system, partial order may be determined with respect to transactions that are associated with the same shared resource and an order between transactions that are associated with different shared resources may not be enforced. For clarity purposes, the disclosure hereinbelow refers to a single shared resource. However, the disclosed subject matter is not limited to such an embodiment.

Referring now to FIG. 1 showing a flowchart diagram of a method, in accordance with some exemplary embodiments of the disclosed subject matter.

In Step 110, a test template is obtained. The test template may define a set of constraints on the test to be generated thereby defining a scenario for the test to perform. In some exemplary embodiments, the scenario may be a reconfiguration scenario. Additionally or alternatively, the scenario may be a non-reconfiguration scenario which may not prohibit reconfiguration scenario. The test template may be created by a user.

In Step 130, test transactions are generated based on the test. In some exemplary embodiments, the test transactions may be generated by a test generator. A test may comprise one or more access transactions that use a shared resource without modifying its configuration. Additionally or alternatively, the test may comprise one or more reconfiguration transactions that are configured, when executed to reconfigure the shared resource.

In some exemplary embodiments, based on the test template, a generator, such as an offline test generator may generate one or more tests that follow the scenario defined by the test template. Each such generated test may be used for verification of the system. In some exemplary embodiments, the generator may utilize heuristics and knowledge regarding bugs, architecture of the system, or the like, in order to bias the generated test to be more likely to detect bugs. In some exemplary embodiments, the generator may generate tests that invoke different mechanisms of the system during the scenario, such as but not limited to a reconfiguration of the shared resource used by transactions.

In Step 140, an order between all transactions is determined. In some exemplary embodiments, the order between transactions may be the generation order of the transactions. In some exemplary embodiments, the order between transactions may be an order determined in the test template. In some exemplary embodiments, the order between transactions may be an order determined by a user. Additionally or alternatively, the order may be determined by the test generator.

In Step 150, pairs of transactions are identified to enforce a partial order between them. In some exemplary embodiments, the identified pairs of transactions include a first transaction that is to be executed prior to the execution of a second transaction. In some exemplary embodiments, the first and second transactions are associated with the same shared resource. In some exemplary embodiments, at least one of the first and second transactions is a reconfiguration transaction, as the order of execution between access transactions may not affect validity of the test. In some exemplary embodiments, the first and second transactions are transactions executed by different executing entities.

It will be noted that a transaction may be associated with one or more transactions in multiple pairs. As an example transaction A may be ordered before transaction B, and after transactions C, D, and E.

In Step 160, synchronization transactions are introduced to the tests so as to be executed by the executing entities with respect to each pair of transaction. The synchronization transactions may enforce that the first transaction of the pair of transactions be executed before the execution of the second transaction of the pair.

The synchronization transactions may employ any synchronization mechanism, including but not limited to mutex operations, lock and unlock operations, wait and signal operations, or the like.

In some exemplary embodiments, the synchronization transactions are used to indicate that an execution entity has reached a certain transaction in the test, such as the transaction of the pair (e.g., prior to its execution) or the following transaction (e.g., after its execution is completed). In some exemplary embodiments, the same synchronization transaction may be used to notify a plurality of executing entities of the reached transaction, thereby reducing the number of transactions in case several transactions in several executing entities are ordered before/after the transaction.

In Step 170, the generated test is outputted. The generated test may be a complete test that is to be used in a simulation of the system or to be executed by the system itself.

In some exemplary embodiments, steps 130-170 may be performed iteratively to generate many different tests based on the test template, a portion of which include a configuration scenario.

Figure 2:
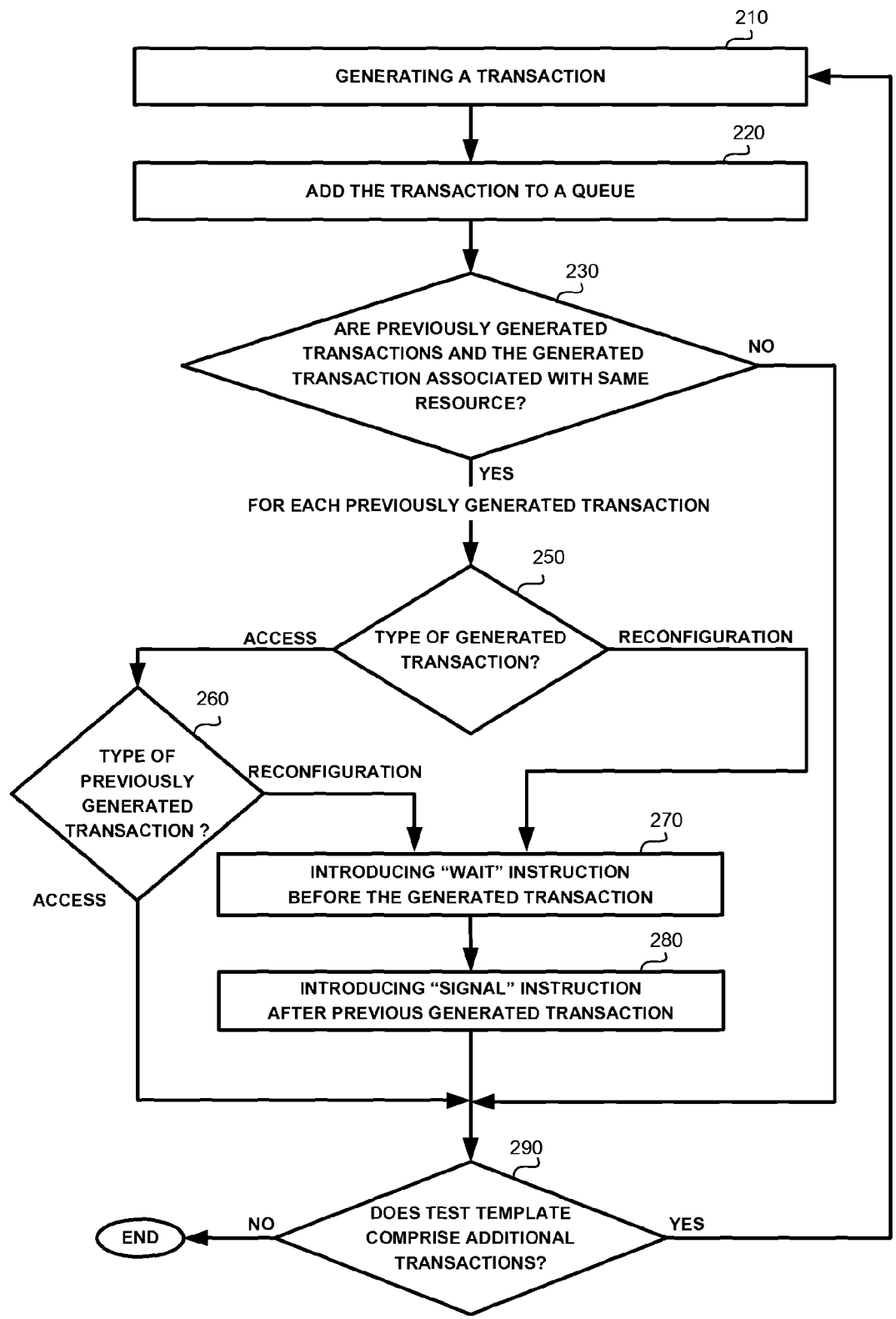
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 210, a transaction to be executed by a system executing entity is generated. The transaction may be generated according to a test template. In some exemplary embodiments, the transaction may be generated by a test generator which may or may not employ heuristics to bias the transaction to employ bug-prone features of the system.

In Step 220, the generated transaction is added to a queue. The queue may be used to track the order of generation of the transactions. In some exemplary embodiments, a different order may be determined and enforced.

In Step 230, the generated transaction of Step 210 is classified with respect to being associated with a shared resource. If the generated transaction of Step 210 is associated with a resource, i.e. the generated transaction of Step 210 is an access transaction or a reconfiguration transaction, then previously generated transactions that are also associated with the resource are identified. In some exemplary embodiments, the previously generated transactions may be identified by using the queue of Step 220.

Steps 250 to 280 may be performed repeatedly with respect to each transaction of the previously generated transaction that were identified in Step 230. In each iteration of Steps 250-280, a different pair of transactions is processed: a previously generated transaction and the transaction of Step 210.

In Step 250, the association of the generated transaction with the resource is characterized. If the generated transaction is a reconfiguration transaction, the execution of the generated transaction of Step 210 may affect the execution of any previously generated transaction that is associated with the resource and Steps 270-280 may be performed to enforce the order of execution.

Alternatively, if the generated transaction is an access transaction, then only in case that the previously generated instruction is a reconfiguration transaction (Step 260), the order of execution is enforced.

In Step 270, a "wait" instruction is introduced to the executing entity that is to execute the generated transaction. The "wait" instruction may be introduced immediately before the generated transaction. The "wait" instruction may be configured to prevent the execution of the generated transaction until a signal is received from a "signal" instruction of Step 280.

In Step 280, a "signal" instruction is introduced to the executing entity executing the previously generated transaction, immediately after the previously generated transaction. The "signal" instruction may be configured, when executed, to send a signal that is configured to release the executing entity that is waiting for the signal (e.g., executing entity that executed the "wait" instruction of Step 270).

In Step 290, the test template is checked. If there are additional transactions to generate, Step 210 is executed, and the additional transaction is generated and processed in accordance with Steps 220-280.

In some exemplary embodiments, Step 230 may only identify previously generated transaction associated with a different executing entity than the executing entity executing the generated transaction. In some exemplary embodiments, each generated transaction may be configured to be executed by a predetermined executing entity. The order of execution of transactions by the same executing entity may be preserved in view of the sequential execution by the executing entity. The order of execution may be required to be enforced only with respect to different executing entities which execute transactions in parallel.

In some exemplary embodiments, in view of the sequential execution of an executing entity not all previously generated transactions that are associated with a shared resource need to be synchronized. As an example, consider the case in which a first executing entity is configured to sequentially execute two access transactions (t1 and t2). Further assume that a second executing entity is later on configured to execute a reconfiguration transaction (t3). The execution may therefore require to enforce t1<t3 ("<" denotes before) and t2<t3. However, as t1<t2 is provided due to the sequential execution, it may be sufficient to enforce t2<t3. In other words, when enforcing execution before a specific transaction it may be sufficient to enforce order of execution with respect to the last generated transaction of each executing entity, which is associated with the resource. Similarly, when enforcing execution after a specific transaction it may be sufficient to enforce order of execution with respect to the first generated transaction of each executing entity that is generated after the transaction. As an example for the second scenario, assume an order of generation t1<t2<t3, where t1 is executed by a first entity while t2 and t3 are executed by a second entity. The disclosed subject matter may enforce the order between t1 and t2 and thereby implicitly enforce the order between t1 and t3 as well.

In some exemplary embodiments, when a transaction is synchronized with a plurality of transactions, the same synchronization transaction may be used to enforce the synchronization. In some exemplary embodiments, the "wait" instruction may be configured to avoid completion of the transaction until several signals are received (e.g., from several different executing entities). Additionally or alternatively, the "signal" instruction may be used to release several "wait" instructions.

Figure 3:
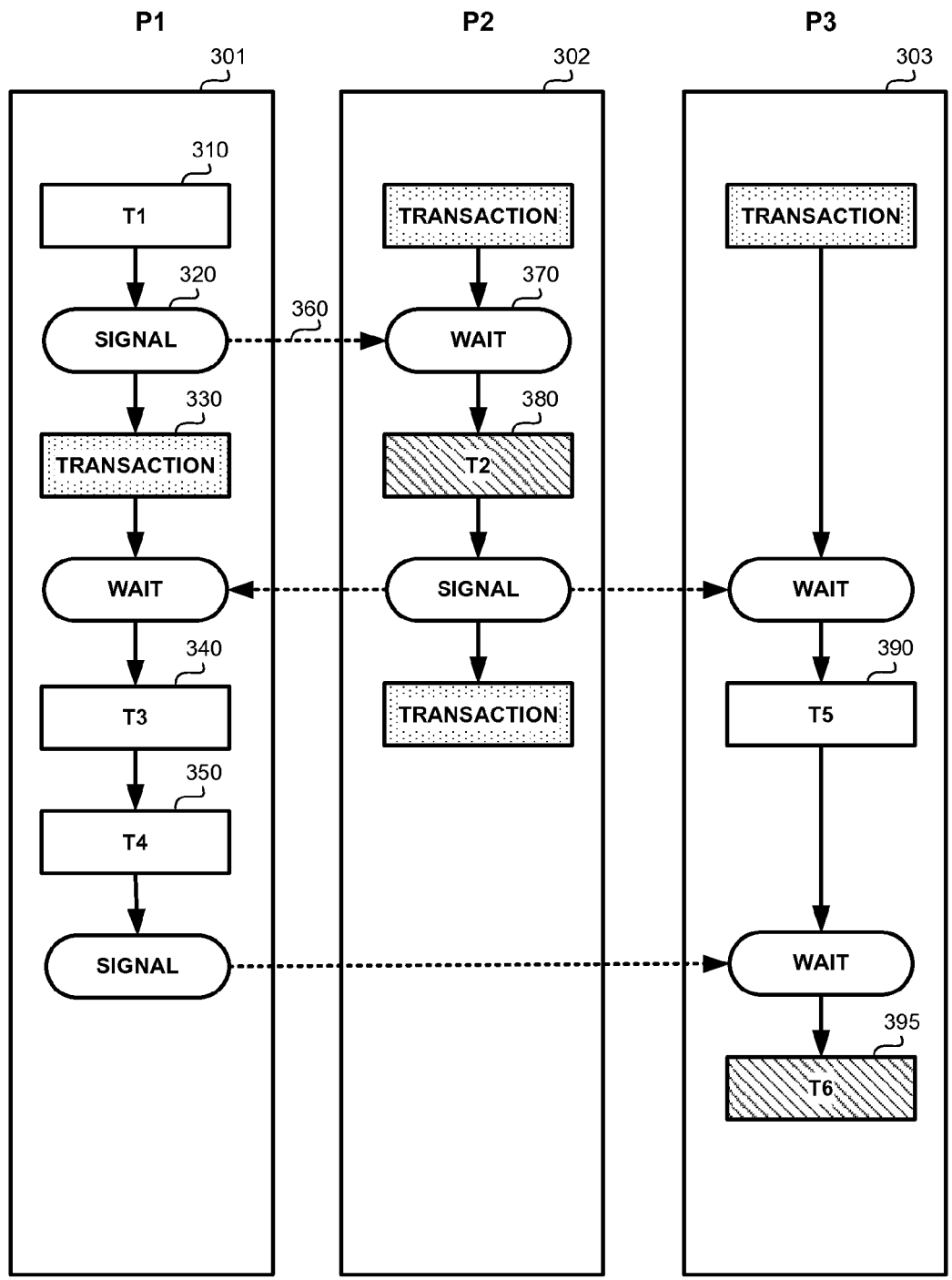
FIG. 3 shows an illustration of an execution order of a test, in accordance with some exemplary embodiments of the disclosed subject matter.

Referring now to FIG. 3 showing an illustration of an execution order of a test, in accordance with some exemplary embodiments of the disclosed subject matter.

Executing Entities 301, 302 and 303 are executing entities of a system, each of which is associated with different transactions. As an example, the generator indicates that Executing Entity 301 is to execute transactions 310, 330, 340 and 350.

FIG. 3 presents names to transactions. The names are used to indicate an order of generation of the transactions by the test generator. As an example Transaction 310 (T1) was generated before Transaction 380 (T2), which in turn was generated before Transaction 340 (T3).

Transaction 310 (T1) is an access transaction associated with a shared resource. Transaction 380 (T2) is a reconfiguration transaction, associated with the same shared resource as Transaction 310 (T1). Transaction 310 (T1) was generated before Transaction 380 (T2), and the partial order between them is enforced by Signal Transaction 320 and Wait Transaction 370.

Signal 360 is sent when Signal Transaction 320 is executed by Executing Entity 301, indicating that the execution of Transaction 310 (T1) is finished, and indicating that Wait Transaction 370 should not prevent the execution of Transaction 380 (T2).

Transaction, such as Transaction 330, that does not require order of execution enforcement is illustrated using dotted area. In some exemplary embodiments, Transaction 330 may not be associated with any shared resource. Additionally or alternatively, Transaction 330 may be associated with a second shared resource however no order enforcement is required, such as in view of all transactions associated with the second shared resource being access transaction, being executed by the same executing entity, or the like.

Transaction 340 (T3), Transaction 350 (T4) and Transaction 390 (T5) are access transactions that are associated with the shared resource, and were generated after Transaction 380 (T2). As these are access transactions, an order therebetween is not enforced.

Although there is no need to enforce an order between access transactions Transaction 340 (T3) and Transaction 350 (T4), may be enforced due to the fact that they are both executed sequentially by Executing Entity 301.

In some exemplary embodiments, although Transaction 390 (T5) was generated after Transaction 340 (T3) and Transaction 350 (T4), none of them is a reconfiguration transaction, and therefore no execution order is enforced between them. Transaction 390 (T5) may be executed before Transaction 340 (T3) or Transaction 350 (T4).

Transaction 340 (T3) and Transaction 390 (T5) were generated after the reconfiguration transaction 380 (T2). A signal transaction is used to release wait instructions in both Executing Entities 301 and 303 to enforce the desired order of execution.

Transaction 395 (T6) may be a reconfiguration transaction. The order between Transaction 395 (T6) and Transaction 380 (T2) is enforced indirectly based on the enforced order between Transaction 390 (T5) and Transaction 380 (T2) and based on the sequential order of Transaction 390 (T5) and Transaction 395 (T6). The order between Transaction 395 (T6) and Transactions 310, 340 and 340 (T1, T3, T4) is enforced using signal and wait transactions to enforce the order between Transaction 350 (T4) and transaction 395 (T6).

Figure 4:
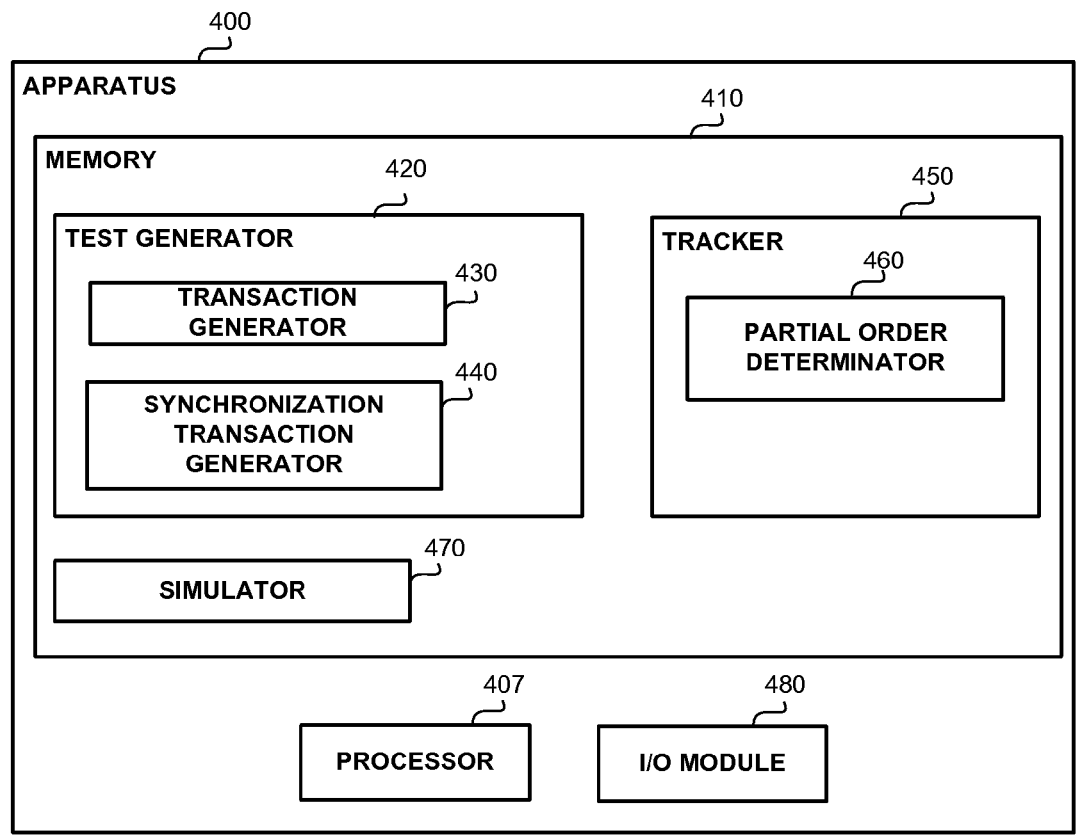
FIG. 4 shows an apparatus in accordance with some exemplary embodiments of the disclosed subject matter.

Referring now to FIG. 4 showing an apparatus in accordance with some exemplary embodiments of the disclosed subject matter.

In some exemplary embodiments, Apparatus 400 may comprise a Processor 407. Processor 407 may be a Central Processing Unit (CPU), a microprocessor, an electronic circuit, an Integrated Circuit (IC) or the like. Processor 407 may be utilized to perform computations required by Apparatus 400 or any of it subcomponents.

In some exemplary embodiments of the disclosed subject matter, Apparatus 400 may comprise an Input/Output (I/O) Module 480. The I/O Module 480 may be utilized to provide an output to and receive input from a user. I/O Module 480 may be configured to retrieve a test template and to output the test. In some exemplary embodiments, the I/O Module 480 may provide for an interface for a user, such as a verification engineer, to interact with Apparatus 400.

In some exemplary embodiments, Apparatus 400 may comprise a Memory 410. Memory 410 may be a hard disk drive, a Flash disk, a Random Access Memory (RAM), a memory chip, or the like. In some exemplary embodiments, the Memory 410 may retain program code operative to cause Processor 407 to perform acts associated with any of the subcomponents of Apparatus 400 and/or steps of FIGS. 1-2.

Test Generator 420 may be configured to generate tests. In some exemplary embodiments, Test Generator 420 may generate tests according to a test template and in view of the requirements defined by the test template.

Transaction Generator 430 generates transactions. In some exemplary embodiments, Transaction Generator 430 generates transactions according to a test template. The transaction may or may not be associated with a shared resource of the system executing the test.

Tracker 450 may be configured to track the generation order of the transactions. In some exemplary embodiments, Tracker 450 may track only the generated transaction associated with the shared resource. Additionally or alternatively, Tracker 450 may track generation of all transactions. In some exemplary embodiments, in response to generating a transaction by Transaction Generator 430, Tracker 450 may be informed of the generated transaction. Additionally or alternatively, Tracker 450 may be informed of whether the generated transaction is associated with a shared resource or not and the type of association (access or reconfiguration transaction). Additionally or alternatively, Tracker 450 may be informed of the executing entity that will execute the transaction once the test is executed.

Partial Order Determinator 460 may be configured to determine whether to enforce a partial order between two transactions. The determination may be based on the tracked order of generation, based on the type of generated transaction and previously generated transaction and based on the executing entity that is configured to execute the transaction.

Tracker 450 may inform Test Generator 420 of a partial order to be enforced. The partial order may be enforced by introducing synchronization transactions by Synchronization Transaction Generator 440.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
    generating, by a test generator, a test for a system having a plurality of executing entities that are capable of concurrent execution,
    the test comprises transactions to be performed by the plurality of executing entities, the transactions comprise:
        one or more access transactions configured, when executed by an executing entity, to use a shared resource during the execution of the test, and
        one or more reconfiguration transactions configured, when executed by an executing entity, to modify a configuration of the shared resource during the execution of the test;
    wherein the test is configured to cause at least two of the executing entities to perform the access or reconfiguration transactions;
    wherein said generating comprises:
        determining a partial order between pairs of transactions that are both associated with the shared resource and that at least one of which is one of the reconfiguration transactions; and
        generating the test so as to enforce the partial order during execution of the test by the system, and
    wherein said generating the test so as to enforce the partial order comprises introducing to the test one or more synchronization transactions that are configured to be executed by the executing entities before or after the execution of one of the access transactions or one of the reconfiguration transactions, wherein the one or more synchronization transactions are configured, when executed, to enforce the partial order.

2. The computer-implemented method of claim 1, wherein the partial order is based on a generation order of the transactions.

3. The computer-implemented method of claim 1, wherein said introducing comprises:
    introducing a first synchronization transaction to be executed after a first transaction is concluded, wherein the first synchronization transaction is configured to issue an indication of its execution; and introducing a second synchronization transaction to be executed before a second transaction is commenced, wherein the second synchronization transaction is configured to delay execution until receipt of the indication; whereby the partial order between the first transaction and the second transaction is enforced during execution of the test.

4. The computer-implemented method of claim a1, wherein the synchronization transactions are selected from the group consisting of: a mutex transaction, a lock transaction, an unlock transaction, a wait transaction, and a signal transaction.

5. The computer-implemented method of claim 1, wherein the test is based on a test template.

6. The computer-implemented method of claim 5, wherein the test template does not require, but does not prohibit, performing a resource reconfiguration transaction, and wherein the test generator determines, based on a heuristic, whether or not to generate the one or more reconfiguration transactions.

7. The computer-implemented method of claim 1, wherein the test does not directly enforce order with respect to transactions that are not associated with the shared resource.

8. The computer-implemented method of claim 1, wherein the system is a hardware system.

9. The computer-implemented method of claim 1, wherein the generator is an offline system level generator that is configured to complete generation of a system-level test prior to execution of the system-level test by a simulator.

10. The computer-implemented method of claim 1, wherein a shared resource is a resource that its modification by a reconfiguration transaction has a potential to affect the execution of another transaction associated with the shared resource.

11. The computer-implemented method of claim 1, wherein the shared resource is a translation table, wherein configuration of the translation table by a first executing entity affects memory access operations by a second executing entity.

12. The computer-implemented method of claim 1, wherein the system having a plurality of shared resources, and wherein said generating is configured to enforce partial order between transactions associated with the same shared resource.

13. An apparatus having a processor, the processor being adapted to perform the steps of:
generating a test for a system having a plurality of executing entities that are capable of concurrent execution,
the test comprises transactions to be performed by the plurality of executing entities, the transactions comprise:
one or more access transactions configured, when executed by an executing entity, to use a shared resource during the execution of the test, and
one or more reconfiguration transactions configured, when executed by an executing entity, to modify a configuration of the shared resource during the execution of the test;
wherein the test is configured to cause at least two of the executing entities to perform the access or reconfiguration transactions;
wherein said generating comprises:
determining a partial order between pairs of transactions that are both associated with the shared resource and that at least one of which is one of the reconfiguration transactions; and
generating the test so as to enforce the partial order during execution of the test by the system, and
wherein said generating the test so as to enforce the partial order comprises introducing to the test one or more synchronization transactions that are configured to be executed by the executing entities before or after the execution of one of the access transactions or one of the reconfiguration transactions, wherein the one or more synchronization transactions are configured, when executed, to enforce the partial order.

14. The apparatus of claim 13, wherein the partial order is based on a generation order of the transactions.

15. The apparatus of claim 13, wherein the test is based on a test template, wherein the test template does not require, but does not prohibit, performing a resource reconfiguration transaction, and wherein said generating the test comprises determining, based on a heuristic, whether or not to generate the one or more reconfiguration transactions.

16. The apparatus of claim 13, wherein the test does not directly enforce order with respect to transactions that are not associated with the shared resource.

17. The apparatus of claim 13, wherein the system having a plurality of shared resources, and wherein said generating is configured to enforce partial order between transactions associated with the same shared resource.

18. A computer program product comprising a non-transitory computer readable medium retaining program instructions, which instructions when read by a processor, cause the processor to perform a method comprising:
generating a test for a system having a plurality of executing entities that are capable of concurrent execution,
the test comprises transactions to be performed by the plurality of executing entities, the transactions comprise:
one or more access transactions configured, when executed by an executing entity, to use a shared resource during the execution of the test, and
one or more reconfiguration transactions configured, when executed by an executing entity, to modify a configuration of the shared resource during the execution of the test;
wherein the test is configured to cause at least two of the executing entities to perform the access or reconfiguration transactions;
wherein said generating comprises:
determining a partial order between pairs of transactions that are both associated with the shared resource and that at least one of which is one of the reconfiguration transactions; and
generating the test so as to enforce the partial order during execution of the test by the system; and
wherein said generating the test so as to enforce the partial order comprises introducing to the test one or more synchronization transactions that are configured to be executed by the executing entities before or after the execution of one of the access transactions or one of the reconfiguration transactions, wherein the one or more synchronization transactions are configured, when executed, to enforce the partial order.

* * * * *